United States Patent Office 3,021,315
Patented Feb. 13, 1962

3,021,315
POLYMERIZATION OF CYCLIC ESTERS
Eugene F. Cox and Fritz Hostettler, Charleston, W. Va., assignors to Union Carbide Corporation, a corporation of New York
No Drawing. Filed Dec. 3, 1959, Ser. No. 856,912
15 Claims. (Cl. 260—78.3)

This invention relates to a process for polymerizing cyclic esters and to the products resulting therefrom.

The most generally familiar works on the polymerization of lactones are the now classical investigations of W. H. Carothers.[1] For instance, Carothers was able to polymerize delta-valerolactone to poly-delta-valerolactone by heating at 80°–85° C. for a period of about 13 days, or by contacting delta-valerolactone with potassium carbonate catalyst at a temperature of 80°–85° C. for a period of about 5 days. The resulting polymers were soft waxes possessing average molecular weights of approximately 2000 which had relatively low thermal stabilities. The literature reports that attempts to polymerize gamma-butyrolactone have been unsuccessful, and the corresponding polyester is not known. In 1934, there was reported[2] the preparation of poly-epsilon-caprolactone by heating epsilon-caprolactone at about 150° C. for a period of 12 hours, or by contacting epsilon-caprolactone with potassium carbonate at about 150° C. for a period of 5 hours. The resulting epsilon-caprolactone polymers had melting points of about 53°–55° C. and average molecular weights of about 4000. The polymers were hard, brittle waxes which could not be cold-drawn into fibers. Bischoff and Waldon[3] describe the transformation of glycolide under the influence of heat or a trace of zinc chloride into a polymeric solid melting at 220° C. On being distilled in a vacuum it was reconverted to the monomer melting at 86°–87° C. The literature also reports the polymerization of lactide at elevated temperatures to a resinous mass. A similar effect is also obtained at relatively lower temperatures by employing potassium carbonate as the catalyst.

In a broad aspect the present invention is directed to the process for polymerizing monomeric cyclic esters in contact with certain double metal hydride catalysts to produce useful polyester products, both the cyclic ester reagents and the catalysts being described hereinafter in a more appropriate section. The average molecular weights of the resulting polymers can range from about several hundred to about several thousand. The homopolymers, copolymers, and terpolymers prepared by the practice of the instant invention are highly useful products as will become apparent at a later section herein. In addition, the polymerization reaction can oftentimes be conducted at lower temperatures and at faster polymerization rates heretofore unattainable in lactone polymerization art.

Accordingly, one or more of the following objects will be achieved by the practice of this invention.

[1] Collected Papers of Wallace H. Carothers, edited by H. Mark and G. S. Whitby, volume I, Interscience Publishers, Inc., New York (1940).
[2] F. J. van Natta, J. W. Hill, and W. H. Carothers, Jour. Amer. Chem. Soc., 56, 455 (1934).
[3] Ber. 36, 1200 (1903).

It is an object of this invention to provide a novel process for homopolymerizing monomeric cyclic esters to produce useful homopolymers. It is another object of this invention to provide a novel process for polymerizing an admixture containing at least two different monomeric cyclic esters to produce useful polymers. A further object of this invention is to prepare lactone polymers having a high degree of utility and application in the cosmetic, wax, polish, thickening, coating, etc., fields. Other objects will become apparent to those skilled in the art in the light of the instant specification.

In one embodiment the monomeric cyclic esters employed in the polymerization process of this invention can be characterized by the following formula:

I
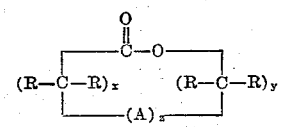

wherein each R, individually, can be hydrogen, alkyl, aryl, alkaryl, aralkyl, cycloalkyl, halo, haloalkyl, alkoxyalkyl, alkoxy, aryloxy, and the like; wherein A can be an oxy (—O—) group, a thio (—S—) group, a divalent saturated aliphatic hydrocarbon group, and the like; wherein $x$ is an integer from 1 to 15 inclusive; wherein $y$ is an integer from 1 to 15 inclusive; wherein $z$ is an integer having a value of zero or one; with the provisos that ($a$) the sum of $x+y+z$ cannot equal 3, ($b$) the total number of atoms forming the cyclic ester ring does not exceed 18, preferably does not exceed 9, ($c$) the total number of organic substituents (such as those described for the R variables) attached to the carbon atoms contained in the cyclic ester ring does not exceed 4, preferably does not exceed 3, ($d$) from 2 to 4 continuously linked carbon atoms contained in the cyclic ester ring can represent a portion of a saturated cycloaliphatic hydrocarbon nucleus which contains from 4 to 10 ring carbon atoms, and ($e$) the four R variables attached to any two adjacent carbon atoms contained in the cyclic ester ring can represent a portion of a fused aromatic hydrocarbon nucleus.

With reference to Formula I supra, illustrative R radicals include, among others, methyl, ethyl, n-propyl, isopropyl, n-butyl, sec-butyl, t-butyl, amyl, the hexyls, the heptyls, the octyls, dodecyl, octadecyl, phenyl, benzyl, tolyl, xylyl, ethylphenyl, butylphenyl, phenethyl, phenylpropyl, phenylbutyl, cyclopentyl, 2-propylcyclohexyl, cyclohexyl, 2-methylcyclohexyl, cycloheptyl, chloromethyl, chloroethyl, bromopropyl, bromobutyl, chloro, fluoro, bromo, iodo, methoxymethyl, ethoxyethyl, propoxymethyl, butoxypropyl, methoxy, ethoxy, n-propoxy, n-butoxy, isopentoxy, n-hexoxy, 2-ethylhexoxy, 3-methyloctoxy, decoxy, dodecoxy, octadecoxy, phenoxy, ethylphenoxy, propylphenoxy, dimethylphenoxy, phenylpropoxy, and the like. It is preferred that each R, individually, be hydrogen, alkyl, and/or alkoxy, and preferably still, that each R, individually, be hydrogen, lower alkyl, e.g., methyl, ethyl, n-propyl, isobutyl, and/or lower alkoxy, e.g., methoxy, ethoxy, propoxy, n-butoxy, and the like. It is further preferred that the total number of carbon atoms in the substituents attached to the cyclic ester ring does not exceed twelve. Cycloalkyl and lower alkyl-substituted cycloalkyl radicals which have from 5 to 7 carbon atoms in the cycloaliphatic nucleus also are preferred.

In the discussion of the generic class of monomeric cyclic esters (Formula I) contemplated in the process of the invention, five provisos enumerated from (a) through (e) have been set forth. Proviso (a) states that the sum of $x+y+z$ cannot be a number equal to three. This proviso excludes cyclic ester compounds which contain five atoms in the ring such as, for example

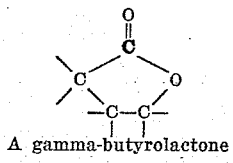

A gamma-butyrolactone

Prior art[4] attempts to polymerize gamma-butyrolactone and the substituted gamma-butyrolactones have been unsuccessful. Attempts to polymerize the cyclic esters, e.g., gamma-butyrolactones, beta-oxa-gamma-butyrolactones, and the like, in the process of this invention likewise have failed. One would postulate that the thermodynamic stability of these monomeric cyclic esters which contain five atoms in the lactone ring is much greater than the corresponding polymers, and that the free energy of interconversion is exceedingly low. Proviso (c) states that the total number of organic substituents attached to the carbon atoms contained in the cyclic ester ring should not exceed four, and preferably should not exceed three. It has been observed that when the total number of organic substitutents on the cyclic ester ring approached four or more, then the polymerizability of the cyclic ester monomer in the process of the invention diminished drastically. Proviso (d) states that from 2 to 4 continuously linked carbon atoms contained in the cyclic ester ring can represent a portion of a saturated cycloaliphatic hydrocarbon nucleus which contains from 4 to 10 ring carbon atoms such as, for example, a saturated cycloaliphatic hydrocarbon nucleus derived from cycloalkane, alkyl-substituted cycloalkane, cyclobutane, cyclopentane, cyclohexane, cycloheptane, cyclooctane, methylcyclopentane, methylcyclohexane, and the like. Thus, for example, the following illustrative cyclic esters would be included in this proviso:

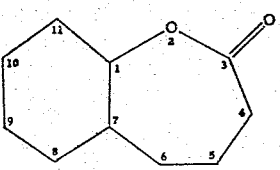

2-oxabicyclo[5.4.0]undecan-3-one (cis or trans)

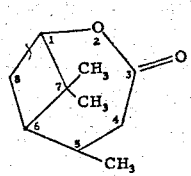

2-oxa-5,7,7-trimethylbicyclo[4.1.1]octan-3-one

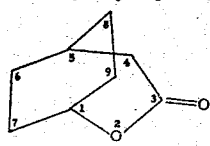

2-oxabicyclo[3.2.2]nonan-3-one

Proviso (e) states that the four R variables attached to any two adjacent carbon atoms contained in the cyclic ester ring can represent a portion of a fused aromatic hydrocarbon nucleus, that is, an aromatic nucleus derived from benzene, alkylbenzene, methylbenzene, propylbenzene, naphthalene and the like. To illustrate this proviso, the following compound is depicted structurally.

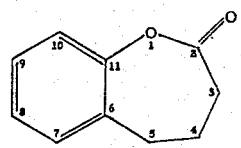

2,3,4,5-tetrahydro-2-keto-benzoxepin

In the structurally depicted compound immediately above, the four R variables which were attached to the carbon atoms designated by numerals 6 and 11 now represent a portion of the fused benzene ring, namely the carbon atoms designated by the numerals 7, 8, 9, and 10. The following compound further illustrates proviso (e).

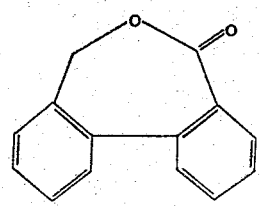

2-(2'-hydroxymethylphenyl)benzene carboxylic acid lactone

Representative monomeric cyclic esters which can be employed as starting materials in the method of the invention include, for example, beta-propiolactone, delta-valerolactone, epsilon-caprolactone, 7-hydroxyheptanoic acid lactone, 8-hydroxyoctanoic acid lactone, 12-hydroxydodecanoic acid lactone, 13-hydroxytridecanoic acid lactone, 14-hydroxytetradecanoic acid lactone, 15-hydroxypentadecanoic acid lactone, 16-hydroxyhexadecanoic acid lactone, 17-hydroxyheptadecanoic acid lactone; the alpha, alpha-dialkyl-beta-propiolactones, e.g., alpha, alpha-dimethyl-beta-propiolactone, alpha, alpha-diethyl-beta-propiolactone, alpha, alpha-dipropyl-beta-propiolactone, and the like; the monoalkyl-delta-valerolactones, e.g., the monomethyl-, monoethyl-, monoisopropyl-, monobutyl-, monohexyl-, monodecyl-, and monododecyl-delta-valerolactones, and the like; the dialkyl-delta-valerolactones in which the two alkyl groups are substituted on the same or different carbon atoms in the cyclic ester ring, e.g., the dimethyl-, diethyl-, diisopropyl-, dipentyl-, and di-n-octyl-delta-valerolactones, and the like; the monoalkyl-, dialkyl-, or trialkyl-epsilon-caprolactones, e.g., the monomethyl-, monoethyl-, monoisopropyl-, monohexyl-, mono-n-octyl-, dimethyl-, diethyl-, di-n-propyl-, diisobutyl-, di-n-hexyl-, trimethyl-, triethyl-, and tri-n-propyl-epsilon-caprolactones, and the like; the monoalkoxy- and dialkoxy-delta-valerolactones and epsilon-caprolactones, e.g., monomethoxy-, monoethoxy-, monoisopropoxy-, dimethoxy-, diethoxy-, and dibutoxy-delta-valerolactones and epsilon-caprolactones, and the like. Further illustrative cyclic esters include 3-ethyl-2-keto-1,4-dioxane, gamma(1 - isopropyl - 4 - methylcyclohexyl) - epsilon-caprolactone, 3-bromo-2,3,4,5-tetrahydrobenzoxepin-2-one, 2-(2'-hydroxyphenyl)benzene carboxylic acid lactone, 10-hydroxyundecanoic acid lactone, 2,5,6,7-tetrahydrobenzoxepin-2-one, 9-oxabicyclo[5.2.2]undecan-8-one, 4-oxa-14-hydroxytetradecanoic acid lactone, alpha, alpha - bis(chloromethyl) - propiolactone, 1,4-dioxane-2-one, 3-n-propyl-2-keto-1,4-dioxane, 3-(2-ethylhexyl)-2-keto-1,4-dioxane, and the like. Illustrative subclasses of cyclic esters which are eminently suitable in the process of the instant invention include the unsubstituted lactones and the oxalactones which contain from 6 to 8 atoms in the lactone ring, preferably delta-valerolactone, epsilon-caprolactone, the keto-dioxanes, and the like; the mono- and polyalkyl-substituted lactones and oxalactones which contain from 6 to 8 atoms in the lactone ring, preferably the mono- and poly-lower alkyl-delta-valerolactones, epsilon-caprolactones, and their corresponding oxalactones wherein the alkyl substituent(s) contains from 1 to 4 carbon atoms, and the like; and the mono- ---
[4] W. H. Carothers, G. L. Dorough, and F. J. van Natta, Jour. Amer. Chem. Soc., 54, 761 (1932).

and polyalkoxy-substituted lactones and oxalactones which contain from 6 to 8 atoms in the lactone ring, preferably the mono- and poly-lower alkoxy-delta-valerolactones, epsilon-caprolactones, and their corresponding oxalactones wherein the alkoxy substituent(s) contains from 1 to 4 carbon atoms.

The unsubstituted and substituted delta-valerolactones, epsilon-caprolactones, zeta-enantholactones, and higher membered lactones, e.g., mono- and polyalkyl-substituted delta-valerolactones, mono- and polyalkoxy-substituted delta-valerolactones, mono- and polycycloalkyl-substituted delta-valerolactones, aryl-substituted delta-valerolactones, mono- and polyhaloalkyl-substituted delta-valerolactones, mono- and polyalkyl-substituted epsilon-caprolactones, mono- and polyalkoxy-epsilon-caprolactones, aryl-substituted epsilon-caprolactones, mono- and polyhaloalkyl-substituted epsilon-caprolactones, mono- and polyalkyl-substituted zeta-enantholactones, and various other lactones described previously can be prepared by reacting the corresponding cyclic ketone with an anhydrous solution comprising peracetic acid and acetone. It is desirable to add the peracetic acid solution to an excess of ketone, e.g., 5 to 1 molar ratio of ketone to peracetic acid, in a still kettle maintained under reflux. The pressure can be adjusted so as to provide a kettle temperature of, for example, about 70° C. Acetone, acetic acid by-product, and minor amounts of ketone can be continuously removed throughout the addition period. Subsequently, the lactone product can be recovered from the still kettle by conventional techniques such as by distillation.

Stoll and Rouvé[5] report the preparation of lactones which contain up to 22 carbon atoms in the lactone nucleus by a process which comprises contacting the corresponding terminal hydroxy saturated aliphatic monocarboxylic acid with benzene-sulfonic acid catalyst in boiling benzene. These authors also report the preparation of other lactone such as 14-alkyl-14-hydroxy-tetradecanoic acid lactone, e.g., 14-hydroxypentadecanoic acid lactone, and oxa-15-hydroxypentadecanoic acid lactone, e.g., 12-oxa-15-hydroxypentadecanoic acid lactone. Palomaa and Tonkola[6] teach the preparation of 3-oxa-6-hydroxyhexanoic acid lactone by heating the corresponding terminal hydroxy saturated aliphatic monocarboxylic acid. The preparation of 2-keto-1,4-dioxane, 3-alkyl-2-keto-1,4-dioxane, polyalkoxy-substituted delta-valerolactone, mono- and polyalkyl-substituted delta-valerolactone, alkoxyalkyl-substituted delta-valerolactone, etc. is recorded by Carothers et al.[7] The preparation of dialkyl-substituted dihalo-substituted lactone, e.g., gamma, delta-dibromo-gamma, delta-dimethyl-delta-valerolactone is reported in the literature by Levina et al.[8] German Pat. No. 562,827 discloses the preparation of 2,3,4,5-tetrahydrobenzoxepin-2-one whereas the literature[9] reports the position isomer, namely 2,5,6,7-tetra-hydrobenzoxepin-2-one. Cycloalkyl-substituted epsilon-caprolactone, e.g., gamma(1 - isopropyl-4-methylcyclohexyl)-epsilon-caprolactone is disclosed by Belov and Kheifits.[10] McKay et al.[11] have recorded the preparation of halo-substituted, haloalkyl - substituted delta-valerolactone. The literature also reports the preparation of various other cyclic esters.

The double metal hydrides contemplated as catalysts in the process of the invention can be characterized by the formula

II  $ABH_4$ wherein A is lithium, sodium, potassium, rubidium, or cesium; wherein B is boron, aluminum, gallium, and indium; or wherein H represents hydrogen. Illustrative double metal hydrides contemplated as catalysts include, among others, lithium aluminum hydride, lithium borohydride, sodium borohydride, sodium aluminum hydride, potassium borohydride, and the like.

The double metal hydrides are employed in catalytically significant quantities. In general, a catalyst concentration in the range of from about 0.001, and lower, to about 10, and higher, weight percent, based on the weight of total monomeric feed, is suitable. A catalyst concentration in the range of from about 0.01 to about 3.0 weight percent is preferred. A catalyst concentration in the range of from about 0.05 to about 1.0 weight percent is highly preferred. For optimum results, the particular catalyst employed, the nature of the monomeric reagent(s), the operative conditions under which the polymerization reaction is conducted, and other factors will largely determine the desired catalyst concentration.

The polymerization reaction can be conducted over a wide temperature range. Depending upon various factors such as the nature of the monomeric reagent(s) employed, the particular catalyst employed, the concentration of the catalyst, and the like, the reaction temperature can be as low as −20° C., and lower, and as high as 250° C., and higher. A suitable temperature range is from about 0° to about 225° C. A reaction temperature in the range of from about 20° to about 200° C. is preferred.

The polymerization reaction preferably occurs in the liquid phase, and to this extent sufficient pressure is employed to maintain an essentially liquid reaction mixture regardless whether or not an inert normally-liquid organic vehicle is employed. Preferably, the polymerization reaction is conducted under an inert atmosphere, e.g., nitrogen, butane, helium, etc. The ultimate molecular weight of the resulting polymer will depend, to an extent, upon various factors such as the temperature, the choice and concentration of the catalyst, the use and amount of an inert normally-liquid organic vehicle(s), and the like.

In general, the reaction time will vary depending on the operative temperature, the nature of the monomeric cyclic esters employed, the particular catalyst and the concentration employed, the use of inert normally-liquid organic vehicle, and other factors. The reaction time can vary from several seconds to several hours, or more, depending on the variables illustrated above.

It is preferred to conduct the polymerization reaction in the essential absence of impurities which contain active hydrogen since the presence of such impurities tends to deactivate the catalyst and/or increase the induction period. The minimization or essential avoidance of impurities such as water, carbon dioxide, aldehydes, ketones, etc., is highly desirable. It is also preferred that the polymerization reaction be conducted under substantially anhydrous conditions.

When polymerizing an admixture containing at least two different cyclic esters, the proportions of said cyclic esters can vary over the entire range. Broadly the concentration of each monomeric cyclic ester is in the range of from about 3 to about 97 weight percent, based on the total weight of said cyclic esters. The preferred range is from about 15 to about 85 weight percent. Admixtures containing epsilon-caprolactone and mono- and/or polyalkyl-substituted epsilon-caprolactone (including isomeric mixtures thereof) are highly preferred as starting materials in the process of the invention. Admixtures containing different mono- and/or polyalkyl-substituted epsilon-caprolactones (including isomeric mixtures of the same and/or different mono- and/or polyalkyl-substituted epsilon-caprolactones) also are highly preferred.

The polymers of this invention can be prepared via the bulk polymerization, suspension polymerization, or the solution polymerization routes. The polymerization reaction can be carried out in the presence of an inert normally-liquid organic vehicle such as, for example,

---

[5] Helv. Chim. Acta, 18, 1087 (1935).
[6] Ber., 66, 1629 (1933).
[7] See footnote 1.
[8] Zhur. Obshchei Khim, 24, 1439 (1954).
[9] Ber., 68B, 1170 (1935).
[10] J. Gen. Chem. USSR, 27, 1459 (1957).
[11] J. Amer. Chem. Soc., 77, 5601-6 (1955).

aromatic hydrocarbons, e.g., benzene, toluene, xylene, ethylbenzene, and the like; various oxygenated organic compounds such as anisole, the dimethyl and diethyl ethers of ethylene glycol, of propylene glycol, of diethylene glycol, and the like; normally-liquid saturated hydrocarbons including the open chain, cyclic, and alkyl-substituted cyclic saturated hydrocarbons such as hexane, heptane, various normally-liquid petroleum hydrocarbon fractions, cyclohexane, the alkylcyclohexanes, decahydronaphthalene, and the like. If desired, a mixture of mutually miscible inert normally-liquid organic vehicles can be employed.

The process of the invention can be executed in a batch, semi-continuous, or continuous fashion. The reaction vessel can be a glass vessel, steel autoclave, elongated metallic tube, or other equipment and material employed in the polymer art. The order of addition of catalyst and monomeric reagent(s) does not appear to be critical. A suitable procedure is to add the catalyst to the reaction zone containing the monomeric reagent(s) and inert organic vehicle, if any. It is highly preferred that the catalyst be added as a suspension or dispersion in an inert normally-liquid organic vehicle such as, for instance, the inert normally-liquid saturated aliphatic and cycloaliphatic hydrocarbons, e.g., hexane, heptane, octane, cyclohexane, alkylcyclohexane, decahydronaphthalene, and the like. Incremetal addition of catalyst to the reaction zone can be employed. If desired, the above procedure can be reversed, that is, the monomeric reagent(s) per se or as a solution or suspension in an inert organic vehicle can be added to the reaction zone which preferably contains the catalyst as a suspension or dispersion in an inert normally-liquid organic vehicle. Also, the catalyst, reagent(s), and inert organic vehicle, if any, can be added to the reaction zone simultaneously. The reaction zone (be it a closed vessel or an elongated tube) can be fitted with an external heat exchanger to thus control undue temperature fluctuations, or to prevent any possible "run-way" reaction temperatures due to the exothermic nature of the reaction. In a continuous operation employing as the reaction zone an elongated tube or conduit, the use of one or a plurality of separate heat exchangers can be conveniently used. In a batch operation, stirring means can be provided for agitating the reaction mixture, as desired.

Unreacted monomeric reagent oftentimes can be recovered from the reaction product by conventional techniques such as by heating said reaction product under reduced pressure. Removal of unreacted monomeric reagent(s) and/or inert organic vehicle can be accomplished by mechanical means such as treatment of the reaction product in a Marshall Mill and the like. The polymer product also can be recovered from the reaction product by washing said reaction product with an inert normally-liquid organic vehicle, e.g., heptane, and subsequently drying same under reduced pressure at slightly elevated temperatures. Another route involves dissolution in a first inert organic vehicle, followed by the addition of a second inert organic vehicle which is miscible with the first vehicle but which is a non-solvent for the polymer product, thus precipitating the polymer product. If desired, the reaction product can be dissolved in an inert organic vehicle such as acetone, and the like, followed by the addition of sufficient water to the resulting solution, said water being miscible with said inert organic vehicle but being a non-solvent for the water-insoluble polymer thereby precipitating the polymer product. Recovery of the precipitated polymer can be effected by filtration, decantation, etc., followed by drying same as indicated previously.

The linear polyester products resulting from the process of the invention can be characterized by the following recurring structural unit:

III

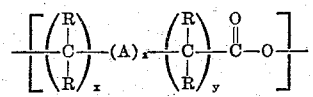

wherein the variables R, A, x, y, and z, have the same values as shown in Formula I supra. Of course, the five provisos enumerated as (a) through (e) set forth in the discussion of Formula I supra likewise apply to the structural unit designated at Formula III above. In addition, as intimated previously, the molecular weights of the polyester products can range from about several hundred to about several thousand. The ultimate molecular weight and properties of the polyester products will depend, in the main, upon the choice of the cyclic ester(s) and catalyst, the concentration of the catalyst, the operative conditions employed, e.g., temperature, etc., the purity of the monomeric reagent(s) and catalyst, the use and amount of an inert normally-liquid organic vehicle, and the like.

It is readily apparent that the linear homopolymers are essentially characterized by the same recurring unit which falls within the scope of Formula III supra. The copolymers, terpolymers, etc., on the other hand, can contain as little as 1.0 weight percent, and lower, and upwards to 99 weight percent, and higher, of the same recurring unit. Desirable polymers are those in which the weight percent of the different recurring units is in the range of from about 3 to about 97. In the highly preferred copolymers the weight percent of the two different recurring units is in the range of from about 15 to about 85.

The polymers obtained by the process of the invention are a useful class of polyester compounds. These polymers can range from viscous liquids to tough solids. The polymers in the range of from very viscous liquids to relatively low molecular weight, wax-like solids are useful in the preparation of cosmetics, polishes, and waxes, and as thickening agents for various lubricants. The polymers can be employed to size cellulosic material or they can be used as anti-static agents in the treatment of fibrous materials. They can also be employed as protective coatings and/or impregnants. The solid polymers are useful for the production of various shaped articles such as brush handles, buttons, lamp bases, toys, and the like.

In passing, it should be noted that one apparent advantage afforded by the practice of the invention is the preparation of copolymers, terpolymers, etc., whose physical characteristics can be "tailor-made" to fit desired fields of applications and uses. In other words, by adjusting the concentration of the monomeric charge to a particular polymerization system, copolymers, terpolymers, etc., which cover a wide spectrum of properties and characteristics can be prepared, e.g., soft, rubbery polymers to tough, solid polymers.

In the illustrative operative examples to follow, the polymeric product is sometimes described as possessing a certain reduced viscosity value. By this term, i.e., "reduced viscosity," is meant a value obtained by dividing the specific viscosity by the concentration of the polymer in the solution, the concentration being measured in grams of polymer per 100 milliliters of solvent at a given temperature. The specific viscosity is obtained by dividing the difference between the viscosity of the solution and the viscosity of the solvent by the viscosity of the solvent. The reduced viscosity value is an indication of the molecular weight of the polymer. Unless otherwise indicated, the reduced viscosity value was determined at 30° C.

Also, in the illustrative operative example below, the polymerization reaction was generally conducted under an inert atmosphere, e.g., nitrogen. The reaction vessel and contents, i.e., cyclic ester(s), catalyst, and inert organic vehicle, if any, were maintained, usually under agitation, in a constant temperature, e.g., 90° C., or the reaction vessel containing the cyclic ester(s) was maintained, usually under agitation, in a constant temperature and subsequently the catalyst was added thereto. Since the polymerization reaction, in general, was exothermic, a rise in temperature was observed, e.g., 140° to 150° C. In several instances the period recorded was the time observed in which the rotation of the mechanical stirrer ceases due to the high viscosity of the contents in the reaction vessel. In most cases the reaction vessel is left in the constant temperature bath for an additional period of time, e.g., about 20 to 30 minutes, or longer. Unless otherwise indicated, the examination or description of the polymeric product is conducted at room temperature, i.e., about 23° C.

EXAMPLE 1

A. To a reaction vessel maintained under a nitrogen atmosphere and which contained epsilon-caprolactone, there was charged lithium aluminum hydride in an amount so as to give an admixture containing 0.1 weight percent lithium aluminum hydride, based on the weight of said epsilon-caprolactone. The reaction vessel then was placed in a constant temperature bath maintained at 90° C. Within one hour the mechanical stirrer ceased due to the high viscosity of the contents in the reaction vessel. Thereafter, the polymer product was recovered. There was obtained a white, soft, waxy, solid homopolymer which possessed a reduced viscosity value of 0.3 (measured at 0.2 gram of polymer in 100 ml. of benzene).

B. In an analogous manner as above, when beta,gamma - dimethoxy-delta - valerolactone is substituted for epsilon-caprolactone and contacted with 1.0 weight percent sodium borohydride, there is obtained a solid polymer.

EXAMPLE 2

A. To a reaction vessel maintained under a nitrogen atmosphere and which contained epsilon-caprolactone, there was charged sodium borohydride in an amount so as to give an admixture containing 0.70 weight percent sodium borohydride, based on the weight of said epsilon-caprolactone. The reaction vessel then was placed in a constant temperature bath maintained at 90° C. Within 56 minutes the mechanical stirrer ceased due to the high viscosity of the contents in the reaction vessel. Thereafter, the polymer product was recovered. There was obtained a white, waxy, brittle solid homopolymer which possessed a reduced viscosity value of 0.2 (measured at 0.2 gram of polymer in 100 ml. of benzene).

B. In an analogous manner as above, when potassium borohydride is substituted for sodium borohydride in an amount so as to give an admixture which contains 0.4 weight percent of potassium borohydride, based on the weight of epsilon-caprolactone, essentially the same results are obtained.

EXAMPLE 3

A. To a reaction vessel maintained under a nitrogen atmosphere and which contains epsilon-caprolactone, there is charged potassium borohydride in an amount so as to give an admixture containing 0.3 weight percent potassium borohydride, based on the weight of said epsilon-caprolactone. The reaction vessel then is placed in a constant temperature bath maintained at 90° C. for a period of 20 minutes. Thereafter, the polymeric product is recovered. There is obtained a white solid.

B. In an analogous manner as above, when gamma(1-isopropyl - 4 - methylcyclohexyl) - epsilon-caprolactone is substituted for epsilon-caprolactone and contacted with 0.7 weight percent sodium aluminum hydride, a viscous liquid product is obtained.

EXAMPLE 4

A. To a reaction vessel maintained under a nitrogen atmosphere and which contains an isomeric mixture of methyl-epsilon-caprolactone, there is charged sodium aluminum hydride, in an amount so as to give an admixture containing 0.5 weight percent sodium aluminum hydride, based on the total weight of methyl-epsilon-caprolactone. The isomeric mixture contains, by weight, approximately 30 percent gamma-methyl-epsilon-caprolactone, about 30 percent epsilon-methyl-epsilon-caprolactone, and about 40 percent beta-methyl- and delta-methyl-epsilon-caprolactone. This isomeric lactone mixture is prepared by reacting a mixture of 2-methyl-, 3-methyl-, and 4-methylcyclohexanone with peracetic acid. The reaction vessel then is placed in a constant temperature bath maintained at 90° C. for a period of 12 minutes. Thereafter, the polymeric product is recovered. There is obtained a very viscous liquid product.

B. In an analogous manner as above, when 2-bromo-2-(3'-bromopropyl)-5-hydroxypentanoic acid lactone is substituted for the isomeric mixture of methyl-epsilon-caprolactones and contacted with 1.0 weight percent lithium borohydride, substantially similar results are obtained.

EXAMPLE 5

A. To a reaction vessel maintained under a nitrogen atmosphere and which contains an isomeric mixture composed of a major proportion by weight of gamma-octyl-epsilon-caprolactone and a minor proportion by weight of epsilon-octyl-epsilon-caprolactone, there is charged lithium aluminum hydride dispersed in heptane in an amount so as to give an admixture containing 0.8 weight percent lithium aluminum hydride, based on the total weight of octyl-epsilon-caprolactone. The reaction vessel then is placed in a constant temperature bath maintained at 90° C. for a period of 40 minutes. There is obtained a very viscous liquid product.

B. In an analogous manner as above, when 2,3,4,5-tetrahydrobenzoxepin-2-one is substituted for the isomeric mixture of octyl-epsilon-caprolactones and contacted with 1.0 weight percent sodium borohydride, there is obtained a solid polymer.

EXAMPLE 6

A. To a reaction vessel maintained under a nitrogen atmosphere and which contains delta-valerolactone, there is charged sodium borohydride dispersed in petroleum ether in an amount so as to give an admixture containing 0.5 weight percent sodium borohydride, based on the weight of said delta-valerolactone. The reaction vessel then is placed in a constant temperature bath maintained at 90° C. for a period of 30 minutes. Thereafter, the polymeric product is recovered. There is obtained a tough, solid homopolymer.

B. In an analogous manner as above, when 3-ethyl-2-keto-1,4-dioxane is substituted for delta-valerolactone and contacted with 1.0 weight percent lithium borohydride, a very viscous liquid is obtained.

EXAMPLE 7

A. To a reaction vessel maintained under a nitrogen atmosphere and which contains beta-methyl-delta-valerolactone (redistilled, boiling point 137° C. at 1.5 mm. of Hg; $n_D^{31}$ of 1.4480) there is charged lithium aluminum hydride in an amount so as to give an admixture containing 1.0 weight percent lithium aluminum hydride, based on the weight of said beta-methyl-delta-valerolactone. The reaction vessel then is placed in a constant temperature bath which is maintained at 90° C. for a period of about 35 minutes. Thereafter, the polymeric product is recovered. There is obtained a viscous liquid product.

B. In an analogous manner as above, when 3-oxa-6-hydroxyhexanoic acid lactone is substituted for beta-methyl-delta-valerolactone and contacted with 0.6 weight percent sodium aluminum hydride, essentially similar results are obtained.

EXAMPLES 8-10

In Examples 8 through 10, various copolymers are prepared by polymerizing an admixture of two lactones in the presence of lithium aluminum hydride. The procedure employed is similar to that set forth immediately preceding the operative examples. The pertinent data and results are recorded in Table I below.

*Table I*

| Example Number | Lactone Charge [1] | Catalyst Concentration [2] | Temp., °C. | Time, Min. | Description of Copolymer |
|---|---|---|---|---|---|
| 8 | 70 epsilon-caprolactone/30 beta-methyl-delta-valerolactone. | 0.4 | 90 | 9 | Tough solid. |
| 9 | 80 epsilon-caprolactone/20 beta-methyl-delta-valerolactone. | 0.4 | 90 | 9 | Tough, film-forming solid. |
| 10 | 85 epsilon-caprolactone/15 beta-methyl-delta-valerolactone. | 0.4 | 90 | 18 | White, waxy solid. |

[1] Parts by weight.
[2] Weight percent catalyst, based on total weight of lactone charge.
NOTE.—Beta-methyl-delta-valerolactone redistilled; B.P. 137° C. at 1.5 mm. of Hg; $n_D^{31}$ of 1.4480.

EXAMPLE 11

A. To a reaction vessel maintained under a nitrogen atmosphere and which contains zeta-enantholactone, there is charged potassium borohydride in an amount so as to give an admixture containing 0.5 weight percent potassium borohydride, based on the weight of said zeta-enantholactone. The reaction vessel then is allowed to stand, at room temperature, for a period of six hours. Thereafter, the polymeric product is recovered. There is obtained a white, solid homopolymer.

B. In an analogous manner as above, when 10-hydroxyundecanoic acid lactone is substituted for zeta-enantholactone and contacted with 0.7 weight percent lithium borohydride, essentially similar results are obtained.

EXAMPLES 12-13

In Examples 12 and 13, the procedure employed is similar to that set forth immediately preceding the operative examples. The pertinent data and results are recorded in Table II below.

*Table II*

| Example Number | Lactone Charge [1] | | Catalyst Concentration [2] | Temp., °C. | Time, Min. | Description of Polyester |
|---|---|---|---|---|---|---|
| 12 | 30 zeta-enantholactone/70 epsilon-caprolactone. | LiAlH₄ | 0.50 | 110 | 18 | Hard, white solid. |
| 13 | 20 zeta-enantholactone/80 epsilon-caprolactone. | LiAlH₄ | 0.50 | 110 | 12 | Tough, white solid. |

[1] Admixture of two lactones is expressed as parts by weight.
[2] Weight percent catalyst, based on total weight of lactone charge.
NOTE.—Zeta-enantholactone redistilled; B.P. 72° C. at 4 mm. of Hg; $n_D^{30}$ of 1.4689.

EXAMPLE 14

A. To a reaction vessel maintained under a nitrogen atmosphere and which contains 2-keto-1,4-dioxane, there is charged lithium borohydride in an amount so as to give an admixture containing 0.3 weight percent lithium borohydride, based on the weight of said 2-keto-1,4-dioxane. The reaction vessel then is placed in a constant temperature bath maintained at 90° C. for a period of about one hour. Thereafter, the polymeric product is recovered. There is obtained a tough, solid polymer.

B. In an analogous manner as above, when gamma(1-isopropyl-4-methylcyclohexyl)-epsilon-caprolactone is substituted for 2-keto-1,4-dioxane and contacted with 1.0 weight percent potassium borohydride, there is obtained a viscous liquid product.

EXAMPLES 15-16

In Examples 15 and 16, various copolymers are prepared by contacting, at 90° C., a mixture of epsilon-caprolactone and delta-valerolactone with 0.4 weight percent of lithium aluminum hydride, based on the total weight of the lactone feed. The procedure employed is similar to that set forth immediately preceding the operative examples. The pertinent data and results are recorded in Table III below.

*Table III*

| Example Number | Ratio of Epsilon-Caprolactone to Delta-Valerolactone [1] | Time, Min. | Description of Copolymer |
|---|---|---|---|
| 15 | 20:80 | 15 | White, hard solid. |
| 16 | 80:20 | 10 | Tough solid. |

[1] Ratio is in parts by weight.

EXAMPLE 17

A. To a reaction vessel maintained under a nitrogen atmosphere and which contains a mixture of 50 parts by weight of epsilon-caprolactone and 50 parts by weight of mixed octyl-epsilon-caprolactones, there is charged lithium aluminum hydride in an amount so as to give an admixture containing 0.5 weight percent lithium aluminum hydride, based on the total weight of the lactone feed. The mixed octyl-caprolactones comprise a major proportion by weight of gamma-octyl- and a minor proportion by weight of epsilon-octyl-epsilon-caprolactones. The reaction vessel then is placed in a constant temperature bath maintained at 90° C. for a period of one hour. Thereafter, the reaction product is dissolved in acetone and reprecipitated in water. There is obtained a waxy copolymer.

B. In an analogous manner as above, when equal parts by weight of 9-oxabicyclo[5.2.2]undecan-8-one and 1,4-dioxane-2-one are employed as the monomeric feed and contacted with 1.5 weight percent potassium borohydride, essentially similar results are obtained.

EXAMPLE 18

To a reaction vessel maintained under a nitrogen atmosphere and which contains equal parts, by weight, of 2,4-dimethyl-4-methoxymethyl-5-hydroxypentanoic acid lactone and epsilon-caprolactone, there is charged sodium borohydride in an amount so as to give an admixture containing 0.5 weight percent sodium borohydride, based on the total weight of the monomeric charge. The reaction vessel then is placed in a constant temperature bath maintained at 90° C. for a period of 30 minutes. Thereafter, the reaction product is dissolved in acetone and reprecipitated in water. There is obtained a soft, solid copolymer.

EXAMPLE 19

A. To a reaction vessel maintained under a nitrogen atmosphere and which contains ortho-(2-hydroxyethyl)-phenylacetic acid lactone, there is charged lithium borohydride in an amount so as to give an admixture containing 0.50 weight percent lithium borohydride, based on the weight of said ortho-(2-hydroxyethyl)-phenylacetic acid lactone. The reaction vessel then is placed in a constant temperature bath maintained at 90° C. for a period of 40 minutes. There is obtained a solid polymer.

B. In an analogous manner as above, when cis-3-oxabicyclo[5.4.0]undecan-4-one is substituted for ortho-(2-hydroxyethyl)-phenylacetic acid lactone and contacted with 1.0 weight percent lithium aluminum hydride, essentially similar results are obtained.

EXAMPLE 20

To a reaction vessel maintained under a nitrogen atmosphere and which contained delta-valerolactone, there was charged potassium borohydride in an amount so as to give an admixture containing 0.6 weight percent potassium borohydride, based on the weight of said delta-valerolactone. The reaction vessel then was placed in a constant temperature bath maintained at 90° C. for a period of 4 hours. Thereafter, the temperature was raised to 150° C. and maintained thereat for an additional 16 hours. There was obtained a viscous liquid product which possessed a reduced viscosity value of 0.05 (measured at 0.2 gram of polymer in 100 ml. of chloroform).

Although the invention has been illustrated by the preceding examples, the invention is not to be construed as limited to the materials employed in the above exemplary examples, but rather, the invention encompasses the generic area as hereinbefore disclosed. Various modifications and embodiments of this invention can be made without departing from the spirit and scope thereof.

What is claimed is:

1. A process which comprises polymerizing a cyclic ester characterized by the following formula:

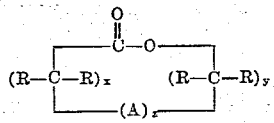

wherein each R, individually, is selected from the group consisting of hydrogen, alkyl, aryl, alkaryl, aralkyl, cycloalkyl, halo, haloalkyl, alkoxyalkyl, alkoxy, aryloxy, a portion of an aromatic hydrocarbon nucleus which nucleus is fused to the cyclic ester ring, and a portion of a saturated cycloaliphatic hydrocarbon nucleus which nucleus contains from 4 to 10 carbon atoms and which is fused to the cyclic ester ring; wherein A is selected from the group consisting of an oxy group, a thio group, and a divalent saturated aliphatic hydrocarbon group, wherein $x$ is an integer in the range of from 1 to 15 inclusive; wherein $y$ is an integer in the range of from 1 to 15 inclusive; and wherein $z$ is an integer selected from the group consisting of zero and one; with the provisos that (a) the sum of $x+y+z$ cannot equal three, (b) the total number of atoms forming the cyclic ester ring does not exceed 18, and (c) the total number of organic substituents attached to the carbon atoms contained in the cyclic ester ring does not exceed four; with from about 0.001 to about 10 weight percent, based on the total weight of cyclic ester of a compund characterized by the following formula:

ABH$_4$ wherein A is selected from the group consisting of lithium, sodium, potassium, rubidium, and cesium; wherein B is selected from the group consisting of boron, aluminum, gallium, and indium; and wherein H is hydrogen; under substantially anhydrous conditons; for a period of time sufficient to produce a polymer.

2. A process which comprises polymerizing an admixture comprising at least two cyclic esters which are characterized by the following formula:

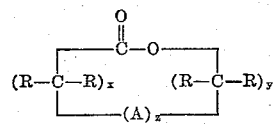

wherein each R, individually, is selected from the group consisting of hydrogen, alkyl, aryl, alkaryl, aralkyl, cycloalkyl, halo, haloalkyl, alkoxyalkyl, alkoxy, aryloxy, a portion of an aromatic hydrocarbon nucleus which nucleus is fused to the cyclic ester ring, and a portion of a saturated cycloaliphatic hydrocarbon nucleus which nucleus contains from 4 to 10 carbon atoms and which is fused to the cyclic ester ring; wherein A is selected from the group consisting of an oxy group, a thio group, and a divalent saturated aliphatic hydrocarbon group; wherein $x$ is an integer in the range of from 1 to 15 inclusive; wherein $y$ is an integer in the range of from 1 to 15 inclusive; and wherein $z$ is an integer selected from the group consisting of zero and one; with the provisos that (a) the sum of $x+y+z$ cannot equal three, (b) the total number of atoms forming the cyclic ester ring does not exceed 18, and (c) the total number of organic substituents attached to the carbon atoms contained in the cyclic ester ring does not exceed four; with from about 0.001 to about 10 weight percent, based on the total weight of cyclic ester, of a compound characterized by the following formula:

ABH$_4$ wherein A is selected from the group consisting of lithium, sodium, potassium, rubidium, and cesium; wherein B is selected from the group consisting of boron, aluminum, gallium, and indium; and wherein H is hydrogen; under substantially anhydrous conditions; for a period of time sufficient to produce a polymer.

3. A process which comprises polymerizing delta-valerolactone with from about 0.01 to about 3.0 weight percent, based on the weight of said delta-valerolactone, of a catalyst characterized by the following formula:

ABH$_4$ wherein A is selected from the group consisting of lithium, sodium, potassium, rubidium, and cesium; wherein B is selected from the group consisting of boron, aluminum, gallium, and indium; and wherein H is hydrogen; at a temperature in the range of from about 0° C. to about 225° C.; under substantially anhydrous conditions; and for a period of time sufficient to produce a polymer.

4. A process which comprises polymerizing an alkyl-substituted delta-valerolactone with from about 0.01 to about 3.0 weight percent, based on the weight of said alkyl-substituted delta-valerolactone, of a catalyst characterized by the following formula:

ABH$_4$ wherein A is selected from the group consisting of lithium, sodium, potassium, rubidium, and cesium; wherein B is selected from the group consisting of boron, aluminum, gallium, and indium; and wherein H is hydrogen; at a temperature in the range of from about 0° C. to about 225° C.; under substantially anhydrous conditions; and for a period of time sufficient to produce a polymer.

5. The process of claim 4 wherein said catalyst is sodium borohydride.

6. A process which comprises polymerizing epsilon-caprolactone with from about 0.01 to about 3.0 weight percent, based on the weight of said epsilon-caprolactone, of a catalyst characterized by the following formula:

$$ABH_4$$

wherein A is selected from the group consisting of lithium, sodium, potassium, rubidium, and cesium; wherein B is selected from the group consisting of boron, aluminum, gallium, and indium; and wherein H is hydrogen; at a temperature in the range of from about 0° C. to about 225° C.; under substantially anhydrous conditions; and for a period of time sufficient to produce a polymer.

7. A process which comprises polymerizing an alkyl-substituted epsilon-caprolactone with from about 0.01 to about 3.0 weight percent, based on the weight of said alkyl-substituted epsilon-caprolactone, of a catalyst characterized by the following formula:

$$ABH_4$$

wherein A is selected from the group consisting of lithium, sodium, potassium, rubidium, and cesium; wherein B is selected from the group consisting of boron, aluminum, gallium, and indium; and wherein H is hydrogen; at a temperature in the range of from about 0° C. to about 225° C.; under substantially anhydrous conditions; and for a period of time sufficient to produce a polymer.

8. A process which comprises polymerizing a monomeric lactone admixture comprising delta-valerolactone and an alkyl-substituted delta-valerolactone with from about 0.01 to about 3.0 weight percent, based on the total weight of the monomeric lactone feed, of a catalyst characterized by the following formula:

$$ABH_4$$

wherein A is selected from the group consisting of lithium, sodium, potassium, rubidium, and cesium; wherein B is selected from the group consisting of boron, aluminum, gallium, and indium; and wherein H is hydrogen; at a temperature in the range of from about 0° C. to about 225° C.; under substantially anhydrous conditions; and for a period of time sufficient to produce a polymer.

9. A process which comprises polymerizing a monomeric lactone admixture comprising delta-valerolactone and epsilon-caprolactone with from about 0.01 to about 3.0 weight percent, based on the total weight of the monomeric lactone feed, of a catalyst characterized by the following formula:

$$ABH_4$$

wherein A is selected from the group consisting of lithium, sodium, potassium, rubidium, and cesium; wherein B is selected from the group consisting of boron, aluminum, gallium, and indium; and wherein H is hydrogen; at a temperature in the range of from about 0° C. to about 225° C.; under substantially anhydrous conditions; and for a period of time sufficient to produce a polymer.

10. A process which comprises polymerizing a monomeric lactone admixture comprising delta-valerolactone and an alkyl-substituted epsilon-caprolactone with from about 0.01 to about 3.0 weight percent, based on the total weight of the monomeric lactone feed; of a catalyst characterized by the following formula:

$$ABH_4$$

wherein A is selected from the group consisting of lithium, sodium, potassium, rubidium, and cesium; wherein B is selected from the group consisting of boron, aluminum, gallium, and indium; and wherein H is hydrogen; at a temperature in the range of from about 0° C. to about 225° C.; under substantially anhydrous conditions; and for a period of time sufficient to produce a polymer.

11. A process which comprises polymerizing a monomeric lactone admixture comprising epsilon-caprolactone and an alkyl-substituted delta-valerolactone with from about 0.01 to about 3.0 weight percent, based on the total weight of the monomeric lactone feed, of a catalyst characterized by the following formula:

$$ABH_4$$

wherein A is selected from the group consisting of lithium, sodium, potassium, rubidium, and cesium; wherein B is selected from the group consisting of boron, aluminum, gallium, and indium; and wherein H is hydrogen; at a temperature in the range of from about 0° C. to about 225° C.; under substantially anhydrous conditions; and for a period of time sufficient to produce a polymer.

12. A process which comprises polymerizing a monomeric lactone admixture comprising epsilon-caprolactone and an alkyl-substituted epsilon-caprolactone with from about 0.01 to about 3.0 weight percent, based on the total weight of the monomeric lactone feed, of a catalyst characterized by the following formula:

$$ABH_4$$

wherein A is selected from the group consisting of lithium, sodium, potassium, rubidium, and cesium; wherein B is selected from the group consisting of boron, aluminum, gallium, and indium; and wherein H is hydrogen; at a temperature in the range of from about 0° C. to about 225° C.; under substantially anhydrous conditions; and for a period of time sufficient to produce a polymer.

13. A process which comprises polymerizing a monomeric lactone admixture comprising an alkyl-substituted epsilon caprolactone and an alkyl-substituted delta-valerolactone with from about 0.01 to about 3.0 weight percent, based on the total weight of the monomeric lactone feed, of a catalyst characterized by the following formula:

$$ABH_4$$

wherein A is selected from the group consisting of lithium, sodium, potassium, rubidium, and cesium; wherein B is selected from the group consisting of boron, aluminum, gallium, and indium; and wherein H is hydrogen; at a temperature in the range of from about 0° C. to about 225° C.; under substantially anhydrous conditions; and for a period of time sufficient to produce a polymer.

14. A process which comprises polymerizing a monomeric lactone admixture comprising two alkyl-substituted delta-valerolactones with from about 0.01 to about 3.0 weight percent, based on the total weight of the monomeric lactone feed, of a catalyst characterized by the following formula:

$$ABH_4$$

wherein A is selected from the group consisting of lithium, sodium, potassium, rubidium, and cesium; wherein B is selected from the group consisting of boron, aluminum, gallium, and indium; and wherein H is hydrogen; at a temperature in the range of from about 0° C. to about 225° C.; under substantially anhydrous conditions; and for a period of time sufficient to produce a polymer.

15. A process which comprises polymerizing a monomeric lactone admixture comprising two alkyl-substituted epsilon-caprolactones with from about 0.01 to about 3.0 weight percent, based on the total weight of the monomeric lactone feed, of a catalyst characterized by the following formula:

$$ABH_4$$

wherein A is selected from the group consisting of lithium, sodium, potassium, rubidium, and cesium; wherein B is selected from the group consisting of boron, aluminum, gallium, and indium; and wherein H is hydrogen; at a temperature in the range of from about 0° C. to about 225° C.; under substantially anhydrous conditions; and for a period of time sufficient to produce a polymer.

References Cited in the file of this patent

UNITED STATES PATENTS

| | | |
|---|---|---|
| 2,558,547 | Eckey | June 26, 1951 |
| 2,720,506 | Caldwell | Oct. 11, 1955 |
| 2,809,958 | Barnes et al. | Oct. 15, 1957 |
| 2,848,441 | Reynolds et al. | Aug. 19, 1958 |
| 2,890,208 | Young et al. | June 9, 1959 |
| 2,921,051 | Amborski et al. | Jan. 12, 1960 |

FOREIGN PATENTS

| | | |
|---|---|---|
| 766,347 | Great Britain | Jan. 23, 1957 |